Nov. 4, 1924.
J. W. LITTLE
1,513,833
BEET DIGGING DEVICE
Filed Feb. 24, 1922  4 Sheets-Sheet 4
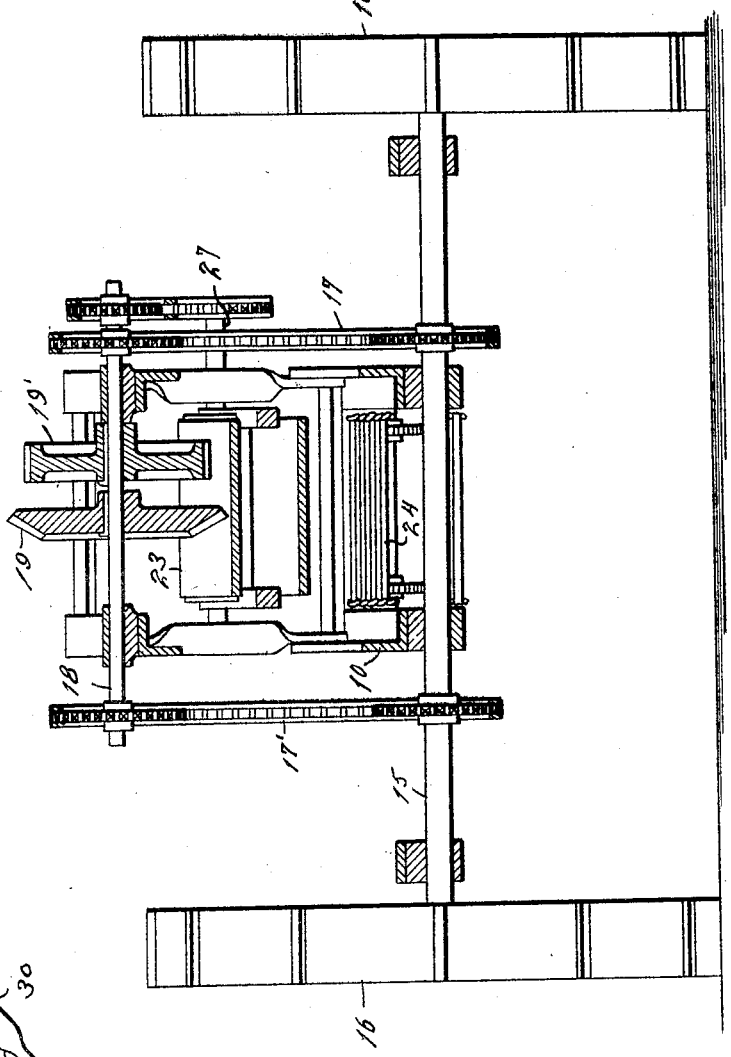
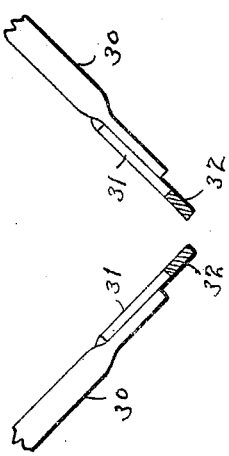
Inventor
John W. Little
By J. Weaver Kelly
Attorney Patented Nov. 4, 1924.

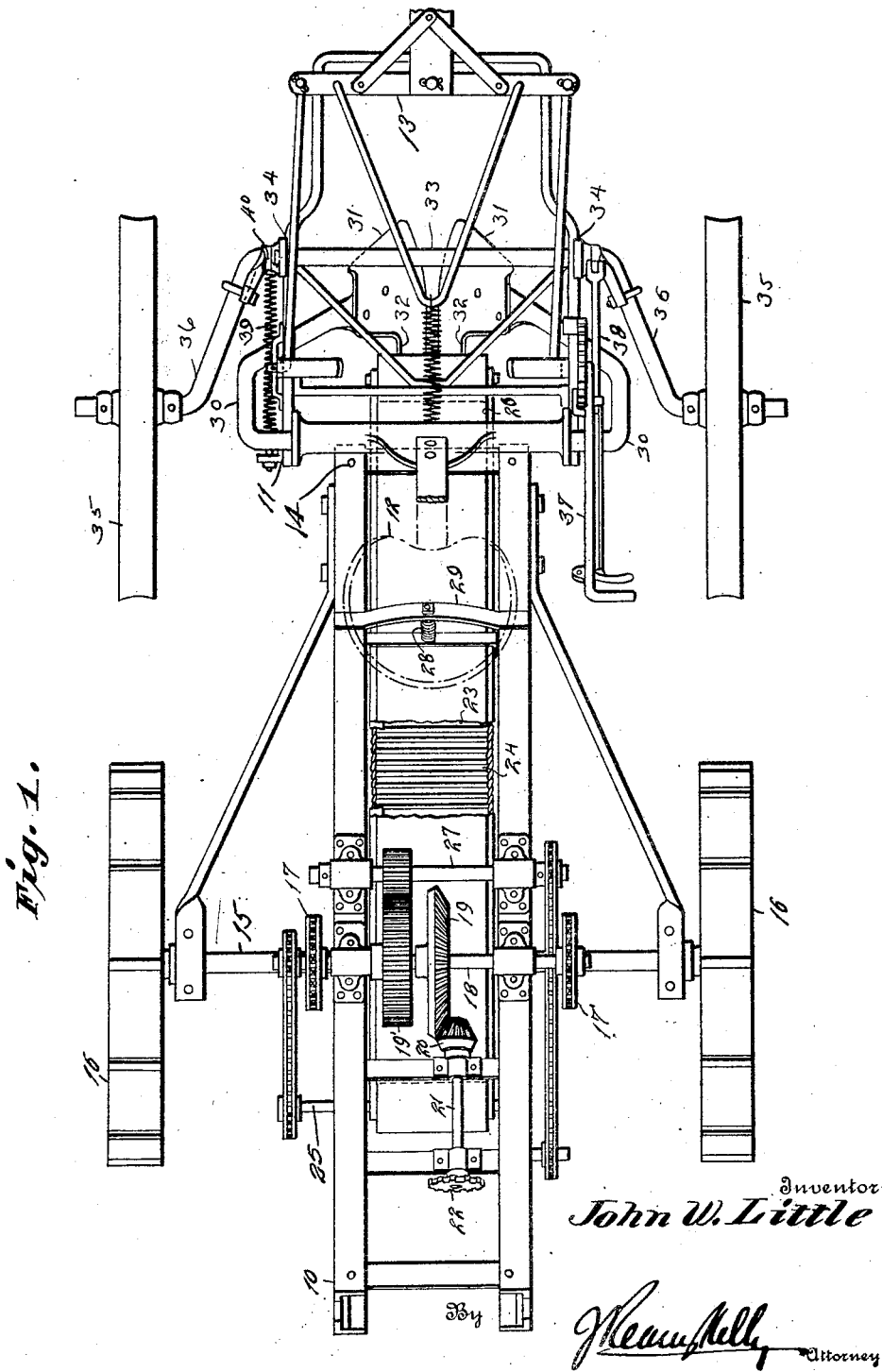

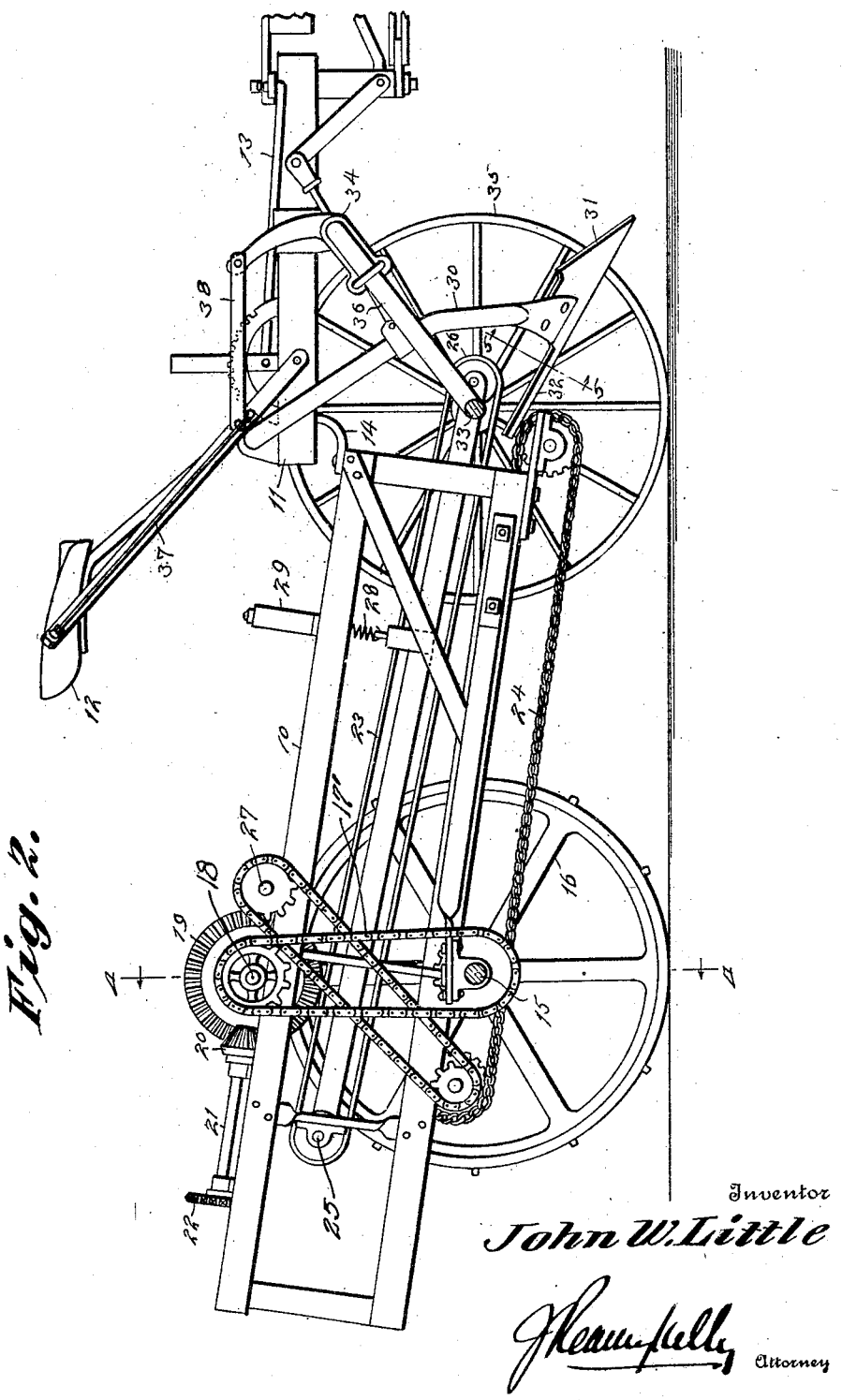

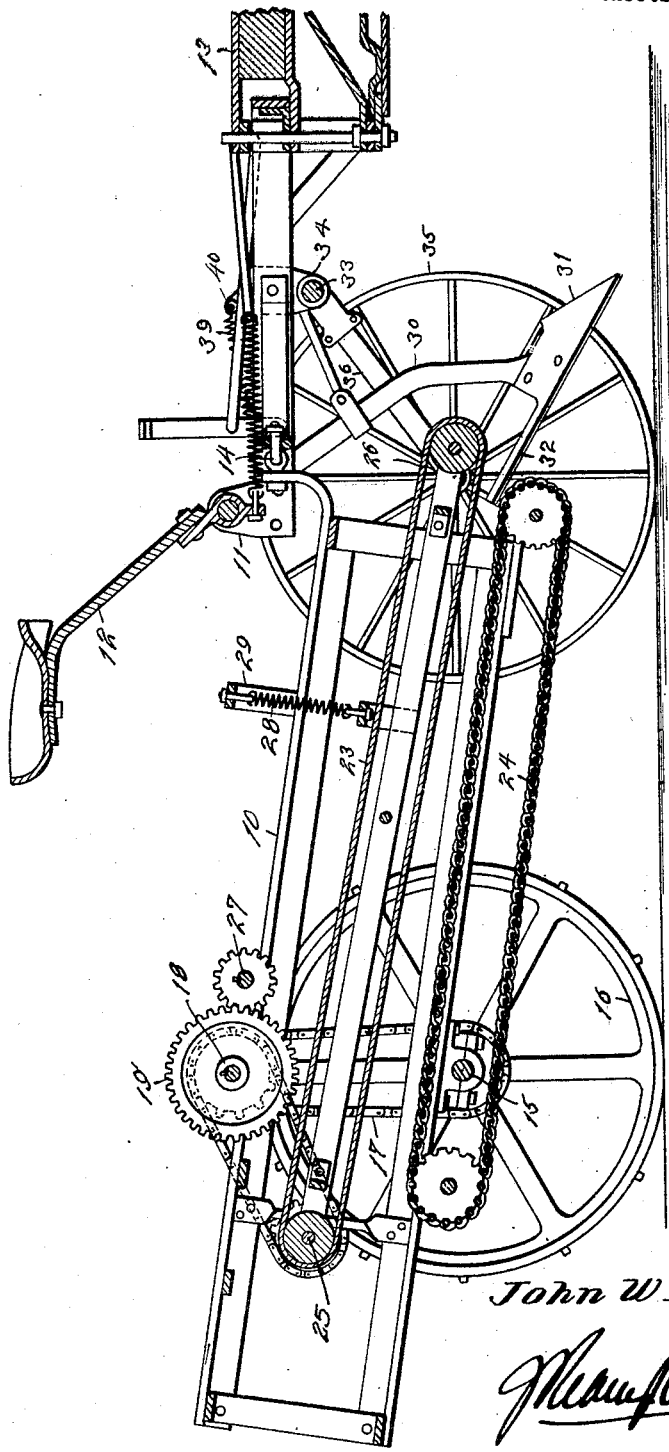

1,513,833

UNITED STATES PATENT OFFICE.

JOHN W. LITTLE, OF McCOOK, NEBRASKA.

BEET-DIGGING DEVICE.

Application filed February 24, 1922. Serial No. 538,981.

*To all whom it may concern:*

Be it known that I, JOHN W. LITTLE, citizen of the United States, residing at McCook, in the county of Redwillow and State of Nebraska, have invented certain new and useful Improvements in Beet-Digging Devices, of which the following is a specification.

This invention relates to a beet digging and elevating machine of generally improved construction and design.

An object of the invention is to provide a digger of the character above mentioned which has self-adjustable conveyor means for automatically adapting itself to beets of various sizes.

A further object is to provide a beet harvester adapted to the digging and elevating of beets and having means for regulating, as to depth and extent to which the ground is penetrated by the beet lifting elements.

Various other objects and advantages of the invention will become apparent as the description proceeds.

In the drawings:

Figure 1 is a top plan view of the beet-digger.

Figure 2 is a side view thereof.

Figure 3 is a central, longitudinal section.

Figure 4 is a vertical cross section on line 4—4 of Figure 2.

Figure 5 is a sectional detail taken thru the diggers as indicated on line 5—5 of Figure 2.

This machine comprises a two-wheeled frame 10 which carries the mechanism and a driver's cart 11 which carries a seat 12 and draft-rigging 13. The frame and cart are connected together as at 14 and power is obtained from rear axle 15 which turns with wheels 16.

Axle 15 is geared, by sprocket-and-chain drives 17 and 17' respectively to shaft 18 of the frame which carries drive gears 19 and 19'. Gear 19 meshes with pinion 20 of the elevator drive shaft 21 which turns in suitable bearings on the frame and carries sprocket 22. The elevator is not shown here but fastens at end of main frame and is run by sprocket 22. Any suitable type of elevator may be used.

Supported within frame 10 on suitable hangers are conveyor means 23 and 24 respectively arranged one above the other in vertical alignment and extending lengthwise of the machine. The conveyors carry beets to the rear of machine where they drop into the bottom of the elevator. The upper or canvas conveyor 23 is fastened at 25 on a pin hinge and the lower end 26 rises or lowers according to the size of the beet being conveyed. The lower or chain conveyor is non-adjustable with respect to the carrying frame.

Each conveyor is driven separately by a machine-and-sprocket drive from opposite sides of frame 10; the belt conveyor being driven from shaft 18 while the chain conveyor is driven from counter shaft 27 which is geared to drive-gear 19'. The belt conveyor is resiliently suspended by means of spring 28 from an arch 29 mounted on the frame as shown. This spring mounting enables the conveyor to rise and fall easily when adapting itself to the various sizes of beets delivered into the space between adjacent runs of the two conveyors.

Fixed to the lower extremities of arm 30 of a carrying member are digger elements 31 which are supported from the cart 11 to hang downwardly in front of conveyors 23 and 24. These elements are pointed to quickly unearth the beets and arranged at an incline to guide the loose beets upwardly and along guide-shanks 32 until delivered between the conveyors. The depth penetrated by the diggers is regulated by adjusting axle 33 in the arc of a circle. This axle which is arched, turns in bearing 34 and is supported in wheels 35, being bent outwardly at the ends 36, to clear the diggers. This axle may be swung in the arc of a circle by lever 37 for raising or lowering the machine and thus regulating the depth to which the digger penetrates. Lever 37 is connected by a link 38 to the axle which is normally held in proper position by tension springs 39. These springs fasten to the frame and to lugs 40 of the axle.

In operation, the turning of the wheels of main frame 10 actuates the conveyors and elevator which receive the beets delivered from the digger. The adjusting lever permits the operator to make any adjustments of the diggers as may be found desirable for lifting beets from various depths and hence, to harvest the beets rapidly and efficiently.

From the foregoing it is believed that the advantages and novel features of the device can be readily understood and further description is unnecessary.

What is claimed is:

1. In a beet digging and elevating machine, in combination, a pair of conveyors extending lengthwise of the machine and arranged one above the other in vertically spaced relation, the upper conveyor being of canvas, pivoted to the frame of the machine and resiliently supported thereby for self-adjustment to automatically adjust itself to various sizes of beets delivered into the space between adjacent runs of the two conveyors, and the lower conveyor being a chain conveyor and non-adjustable with respect to the said frame, and digger elements arranged to project in front of the said conveyors and inclined to guide loose beets between the said conveyors.

2. In a digging machine, in combination, a supporting frame, a driver's cart connected thereto, a non-adjustable chain conveyor supported in the said frame and extending lengthwise thereof, digger elements depending from the said cart in advance of the said chain conveyor and being inclined to guide loose beets onto the said chain conveyor, a canvas conveyor supported in the said frame and arranged above the said chain conveyor in vertically spaced relation to the latter, said canvas conveyor having its rear end hingedly fastened to the frame, and a spring resiliently suspending the front end of the canvas conveyor from the frame to enable the said conveyor to rise and fall in adapting itself to various sizes of beets delivered into the space between the said conveyors.

In testimony whereof I affix my signature.

JOHN W. LITTLE.